Aug. 21, 1962 G. E. COLBY 3,050,319
RADIALLY CONTACTING SEAL WITH BALANCING SLEEVE
Filed May 22, 1956

INVENTOR.
George E. Colby
BY
Barlow & Barlow
ATTORNEYS.

United States Patent Office 3,050,319
Patented Aug. 21, 1962

3,050,319
RADIALLY CONTACTING SEAL WITH
BALANCING SLEEVE
George E. Colby, Barrington, R.I., assignor to Magnetic
Seal Corp., a corporation of Rhode Island
Filed May 22, 1956, Ser. No. 586,417
5 Claims. (Cl. 277—41)

This invention relates to a seal of the type which may be used between a housing and a rotary shaft extending through a wall of the housing.

In seals of this character where high pressures are encountered, it is necessary to provide some means of balancing the pressure so far as its effect upon the sealing is concerned so that the seal may be maintained regardless of the pressure. Frequently it is desirable in high pressure seals to provide an arrangement so that as the pressure increases, the action on the part of the seal, which is under influence of this pressure and which acts to seal the fluid under pressure, will be increased so that the seal will be better maintained regardless of the pressure of the fluid which it is to seal.

One of the objects of this invention is to provide a seal which, when the pressures get too great, will cease to become a seal, thus allowing a relief pressure across the sealing surface so as to protect other parts of the device with which it is associated.

Another object of the invention is to provide an arrangement whereby the sealing faces may align themselves for better sealing engagement.

Another object of the invention is to provide a shell having a portion thereof of the diameter necessary to provide the desired relationship between the pressure of the fluid to be sealed and the mechanical means to maintain the sealing surfaces in engagement.

Another object of the invention is to provide a shell which may be positioned securely upon the rotary shaft extending through the casing where the seal is to be formed, which shell may be constructed to cause the pressure relations desired.

Another object of the invention is to provide a magnetic urge to maintain the sealing surfaces in engagement up until the pressure increases to the extent at which separation of the sealing surface is designed to take place.

With these and other objects in view, the invention consists of certain novel features of construction as will be more fully described and particularly pointed out in the appended claims.

Figure 1:
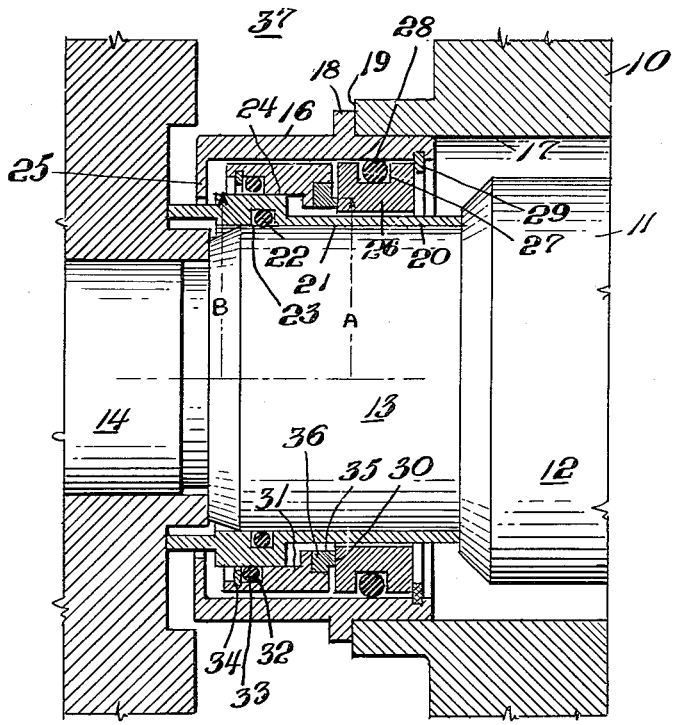
FIGURE 1 is a sectional view through a housing and shaft which is equipped with the seal of this invention.

In proceeding with this invention, I have provided a balancing shell to snugly engage the shaft through the housing at the location where the seal is to be provided with an arrangement for preventing the passage of fluid between the shell and the shaft. This shell is provided with a shoulder of substantial axial extent along which a sealing sleeve which carries a sealing face may axially move. The relation between the outer diameter of the sealing face and the shoulder may be varied so that fluid pressure on this sleeve is in complete balance or the sleeve may be urged either toward sealing engagement or away from sealing engagement. When the seal is completely in balance, the action of a magnet which is also provided with a sealing face serves to keep the faces in engagement, and when it is desired that there be some relief from pressure beyond a certain amount, I will so adjust the diameters that the magnet will hold the sealing faces in engagement up until a certain pressure is developed, and then the sleeve will be moved away from the sealing face to permit relief of this pressure so that no damage will be done to other parts of the device. A structure of this sort is especially desirable in connection with a fluid coupling such as put out for use in automobiles at the present time, it having been experienced that heat sometimes develops to increase the temperature of the fluid to be sealed to such an extent that some parts of the housing will blow out if the seal does not let go.

With reference to the drawings, 10 designates a housing through which there extends a shaft 11 which is stepped from the larger diameter 12 to an intermediate diameter 13 and a smaller diameter 14 providing shoulders between these different diameters.

A cartridge casing 16 of cylindrical form closely fits the bore 17 of the housing 10 with a radial fin 18 engaging a shoulder 19 of this housing. This cartridge casing contains all of the parts of the present seal, which are pre-assembled as a unit for insertion in the casing and on to the portion 13 of the shaft.

A tubular shell 20 is located within this cartridge casing 16 and projects axially beyond the ends of the casing 16. It is of a size along its inner surface 21 to snugly fit the portion 13 of the shaft 11 and is sealed against the movement of fluid pressure along this shaft by an elastic O-ring 22 located within a recess 23 extending radially outwardly from the inner surface 21 of this shell. This shell is also provided with an outwardly extending radial shoulder 24 of substantial axial extent. A flange 25 on the end of the cartridge casing extends inwardly beyond this shoulder so as to prevent it from being moved to the left out of the cartridge casing.

A magnet of annular form 26 is secured to the cartridge casing by means of a recess 27 in its outer surface and an elastic O-ring 28 located in this recess and in firm engagement with the inner surface of the cartridge casing. This seals the magnet to the casing against the passage of fluid between the cartridge and the casing. A split ring 29 engages the right-hand surface of the magnet as seen in FIGURE 1 to prevent axial movement of the magnet in this direction. The O-ring also permits the magnet small axial movement and also rocking slightly so that an annular sealing surface 30 thereof may properly align itself to provide the desired seal. There is a slight clearance between the magnet and the shell which it encircles, permitting this rocking movement. The magnet is formed of a material known as "Alnico" which, according to the General Electric Company Catalogue Carboloy Division, which carries a reprint of the permanent magnet design manual published in 1949, has the following percentages by weight: aluminum 6–12%; nickel 14–25%; cobalt 12½–35%; copper 0–6%; and balance iron.

A sleeve 31 encircles the shell 20 and is located as is the magnet between the cartridge casing and the shell and is slidable axially in this location. This sleeve extends along the shoulder 24 a substantial extent where it is recessed as at 32 to receive the O-ring 33 which provides for some axial movement but prevents the passage of fluid under pressure along the surface of the shoulder between it and the inner surface of the sleeve 31. The O-ring 33 is held in position by a split ring 34 engaging a recess in the sleeve 31. The other end of this sleeve is provided with a sealing face 35 which in this case is provided by means of an inserted carbon ring 36 having a lapped face 35. The O-ring mounting of the sleeve also permits of a slight adjustment so that sealing faces 30 and 35 may properly align to provide a good seal between them.

The outer diameter of this sealing face is designed A in FIGURE 1 and will be close to the diameter B of the shoulder so that the sleeve will be in substantial balance with respect to the fluid pressure extending as at 37 about the cartridge casing urging it axially. However, the diameter A will be slightly smaller than the diameter B so that there will be a slight tendency for the fluid pressure to move the sleeve away from sealing engagement between the faces or to the left as shown in FIGURE 1. The strength of the magnet 26 acting upon the sleeve 31 will be such as to overcome such slight pressure as will exist under normal pressure developed in the casing, but when some abnormal pressure conditions exist due to overheating, then this pressure increase will be such that the pressure will force the sleeve to the left, separating the sealing faces and permitting the fluid to escape before the pressure rises to a point to break any other parts of the device.

Figure 2:
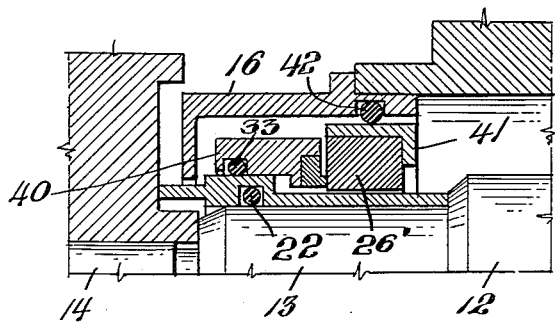
FIGURE 2 is a fragmentary sectional view, illustrating a modified means of mounting a magnet in place and of holding the soft packing of the shell in place.

In some cases instead of having a split ring 34 to hold the O-ring 33 in place, there may be a flange 40 provided, as shown in FIGURE 2.

In some cases instead of using a non-magnetic cartridge casing 16, a magnetic cartridge case may be provided, and the magnet 26 may be mounted in a non-magnetic cap 41 with an O-ring 42 between this non-magnetic cap 41 and the casing 16. This still permits the magnet 26' and cap 41 to be rocked as a unit for alignment of the sealing face.

I claim:

1. A rotary seal to prevent the escape of fluid under pressure from between relatively rotatable parts comprising a housing part, a shaft part extending through said housing part, a first member surrounding said shaft part and having an annular sealing surface thereon in a single plane, an O-ring between said member and said housing part anchoring said member thereto against relative rotary movement, a second member having an annular sealing surface thereon in a single plane in fluid sealing engagement with the first said annular sealing surface, an O-ring between said second member and said shaft part anchoring said second member thereto against relative rotary movement, one member being wholly a magnetized material and the other member comprising a magnetically attractable material drawing said sealing faces together, said two members together being spaced at one of their ends for limited axial movement together relative to said housing and shaft parts and said members being also spaced from said parts along their circular surfaces sufficiently for individual rocking movement of said members about said O-rings for alignment of said sealing faces whereby said members are unrestrained by any external influence and rotation of said shaft even though its axis is at a slight angle to the axis of the housing will cause said members to align said sealing faces in a plane perpendicular to said shaft axis.

2. A rotary seal to prevent the escape of fluid under pressure as set forth in claim 1 wherein said magnetically attractable member is provided with an insert of carbon presenting a sealing face running against the member consisting of the magnetized material.

3. A rotary seal to prevent the escape of fluid under pressure from between relatively rotatable parts as set forth in claim 1 wherein said magnetized material comprises essentially aluminum, nickel, cobalt, and iron and said magnetically attractable member is provided with an insert of carbon presenting a sealing face running against the member consisting of the magnetized material.

4. A seal for acting between a housing and a rotary shaft extending through a wall thereof comprising a tubular shell to be secured to the shaft having a radially outwardly extending shoulder, a magnet provided with a sealing face encircling said shell, a sleeve provided with a sealing face to engage the sealing face of the magnet and also encircling said shell with a portion of its inner surface extending along and slidable on said shoulder of said shell, a soft packing between said shoulder and sleeve to seal the passage between them, a casing, a soft packing between said magnet and casing to hold the magnet thereto and provide a seal between them, the outer diameter of the shoulder being greater than the outer diameter of the sealing face provided on the sleeve whereby the fluid pressure tends to move the faces out of sealing engagement, said magnet being sufficiently strong to overcome this tendency to move apart in normal pressure operation but overcome to relieve abnormal pressure should the same exist.

5. A seal for acting between a housing and a rotary shaft extending through a wall thereof comprising a cartridge casing to be fixed to the housing, a tubular shell within said casing to be secured to the shaft and concentric with and spaced from the casing, said shell having a radially outwardly extending shoulder, a magnet provided with a sealing face located between said shell and casing and sealed to the casing, a sleeve provided with a sealing face to engage the sealing face of the magnet and also located between said shell and casing with a portion of its inner surface extending along and slidable on said shoulder of said shell, a soft packing between said shoulder and sleeve to seal the passage between them, the outer diameter of the shoulder being greater than the outer diameter of the sealing face provided on the sleeve whereby the fluid pressure tends to move the faces out of sealing engagement, said magnet being sufficiently strong to overcome this tendency to move apart in normal pressure operation but overcome to relieve abnormal pressure should the same exist.

References Cited in the file of this patent

UNITED STATES PATENTS

| 2,297,302 | Hornschuch | Sept. 29, 1942 |
| 2,405,464 | Storer | Aug. 6, 1946 |
| 2,470,419 | Voytech | May 17, 1949 |
| 2,556,225 | Serge | June 12, 1951 |
| 2,685,463 | Pollard | Aug. 3, 1954 |

FOREIGN PATENTS

| 678,981 | Great Britain | Sept. 10, 1952 |